(No Model.)

I. B. STILLMAN.
FENCE.

No. 341,359. Patented May 4, 1886.

Witnesses.
John C. Miller
A. L. Kayser

Ira B. Stillman
Inventor.
W. T. Fitzgerald
Attorney.

UNITED STATES PATENT OFFICE.

IRA B. STILLMAN, OF HORNELLSVILLE, NEW YORK.

FENCE.

SPECIFICATION forming part of Letters Patent No. 341,359, dated May 4, 1886.

Application filed April 15, 1884. Renewed February 25, 1886. Serial No. 193,224. (No model.)

*To all whom it may concern:*

Be it known that I, IRA B. STILLMAN, a citizen of the United States, residing at Hornellsville, in the county of Steuben and State of New York, have invented certain new and useful Improvements in Fences; and I do hereby declare the following to be a full, clear, and exact description of the invention, such as will enable others skilled in the art to which it appertains to make and use the same.

The object of this improvement is the production of a strong, neat, durable, and fireproof fence, suitable for general purposes, and more especially designed for erection in localities likely to be visited by fire.

Figure 1:
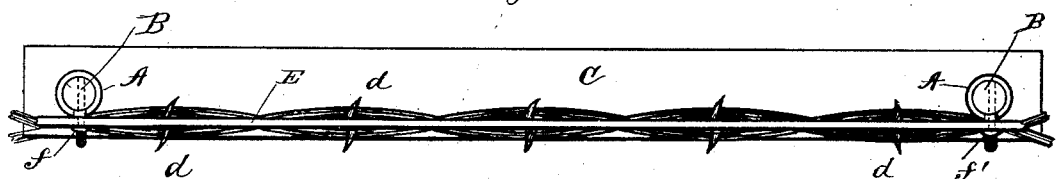
Figure 2:
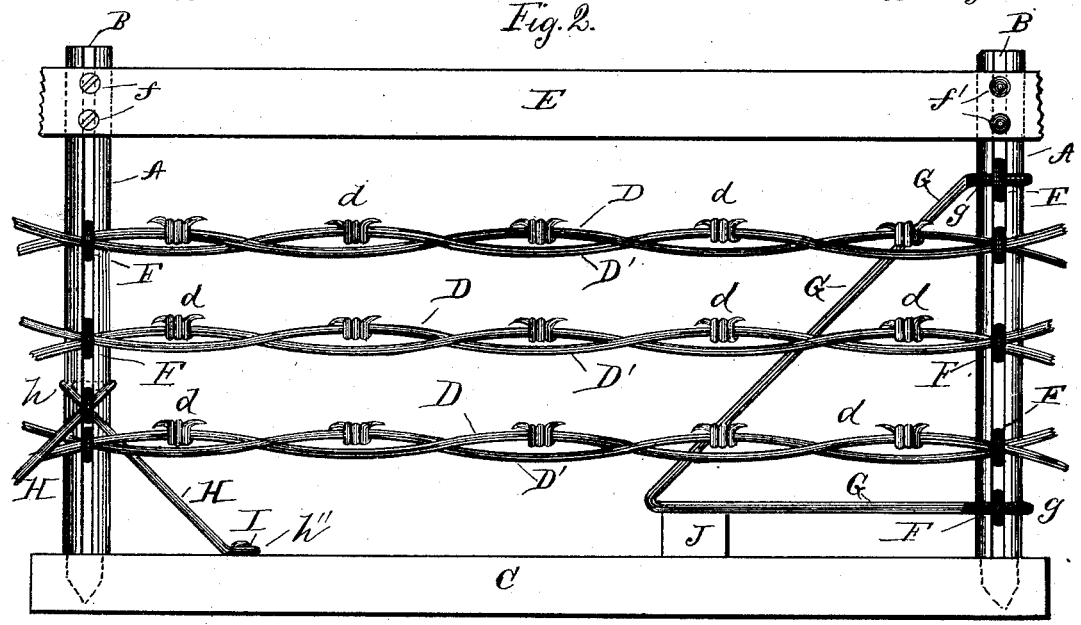
Figure 3:
Figures 4, 5:
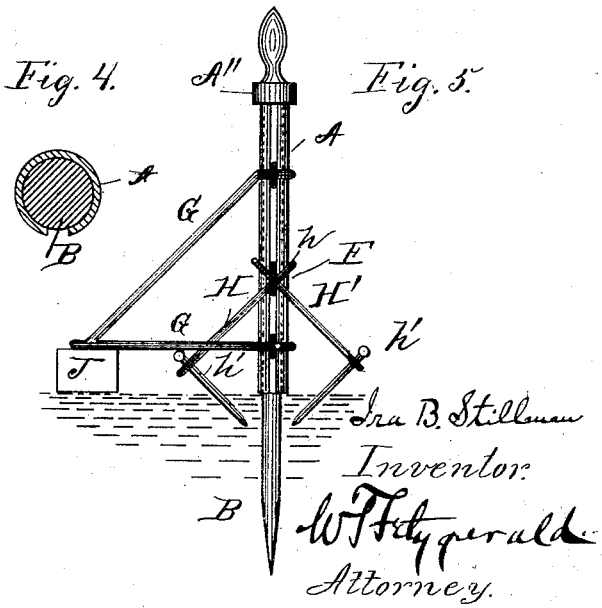

In the accompanying drawings, forming a part of this specification, Figure 1 is a plan view of a panel or section of my improved fence. Fig. 2 is a side elevation of the same. Fig. 3 is a detail view of a modification. Fig. 4 is a transverse section through one of the fence-posts; and Fig. 5 represents a side elevation of modified arrangement of fence-post and braces.

Each of the fence-posts consists of a sheet-metal cylinder, A, provided with a slot which extends its entire length.

B is a wooden rod, fitting closely within the cylinder and extended a slight distance beyond the lower end of the said cylinder, as represented in dotted lines, Fig. 2.

C is a sill-piece, mortised to receive the tenon of each post for supporting each post in position.

D D' are twisted wires provided with barbs $d$, and secured to the posts by staples F, driven into the rod B, through the slot $a$ of the post A.

E is a plank or beam, secured to the rod B either by means of screws, as shown at $f$, or wrought-nails, as shown at $f'$, which may be driven through the rod B and made to clinch on the opposite side thereof by their ends coming in contact with the cylinder A.

G represents an iron rod bent in an angle and around the cylinder A of each post, as shown at $g$, and secured to the rod B by means of staples F. The object of the said rod G is to brace the fence either laterally or longitudinally, as may be desired. The brace G is attached to the post after the latter has been placed in position, but before either the wires or beam E is attached.

J is a block forming a rest or bearing for the brace G.

In Fig. 3 the lower end of the cylinder is represented as being expanded. This enables the cylinder to have a larger bearing.

In Fig. 5 both the beam E and sill C are dispensed with, the posts being driven into the ground. It will be observed, by reference to said figure, that the extended portion of the rod A is pointed instead of being formed into a tenon, thus enabling it to be readily forced into the ground. A metal cap may be placed upon the upper end of each fence-post to permit the same to receive blows for driving the extended portion into the ground.

H' represents a guy-rod secured to the post by a staple, F, and to the ground by means of the stakes $h'$, which should be driven on an incline, as shown.

A" is a post-cap or head-piece, which may be set on for ornamental purposes.

The post should be rolled in cement and sanded to make it fire and weather proof.

I claim—

The combination, in a fence-post, of a slotted metal cylinder, A, the central wooden rod or core, B, extending beyond said cylinder at its lower end, a brace-rod, G, bent as described and secured to said cylinder by being looped around the same and held in position by means of fastening devices secured to said central core and projecting through the slot of said cylinder, and a series of additional fastening devices secured to said central core and projecting through said slot for the reception and retention of the wires of the fence, substantially as set forth.

In testimony whereof I affix my signature in presence of two witnesses.

IRA B. STILLMAN.

Witnesses:
JAMES L. CALDWELL,
JOEL S. EDWARDS.